Feb. 1, 1966 R. C. PRUSINSKI ETAL 3,232,017
INSULATED STRUCTURAL PANEL WITH SYNTHETIC FOAM CORE AND
ORNAMENTAL FACING OF VISIBLE DISCRETE
PARTICULATE MATERIAL
Filed Feb. 7, 1963
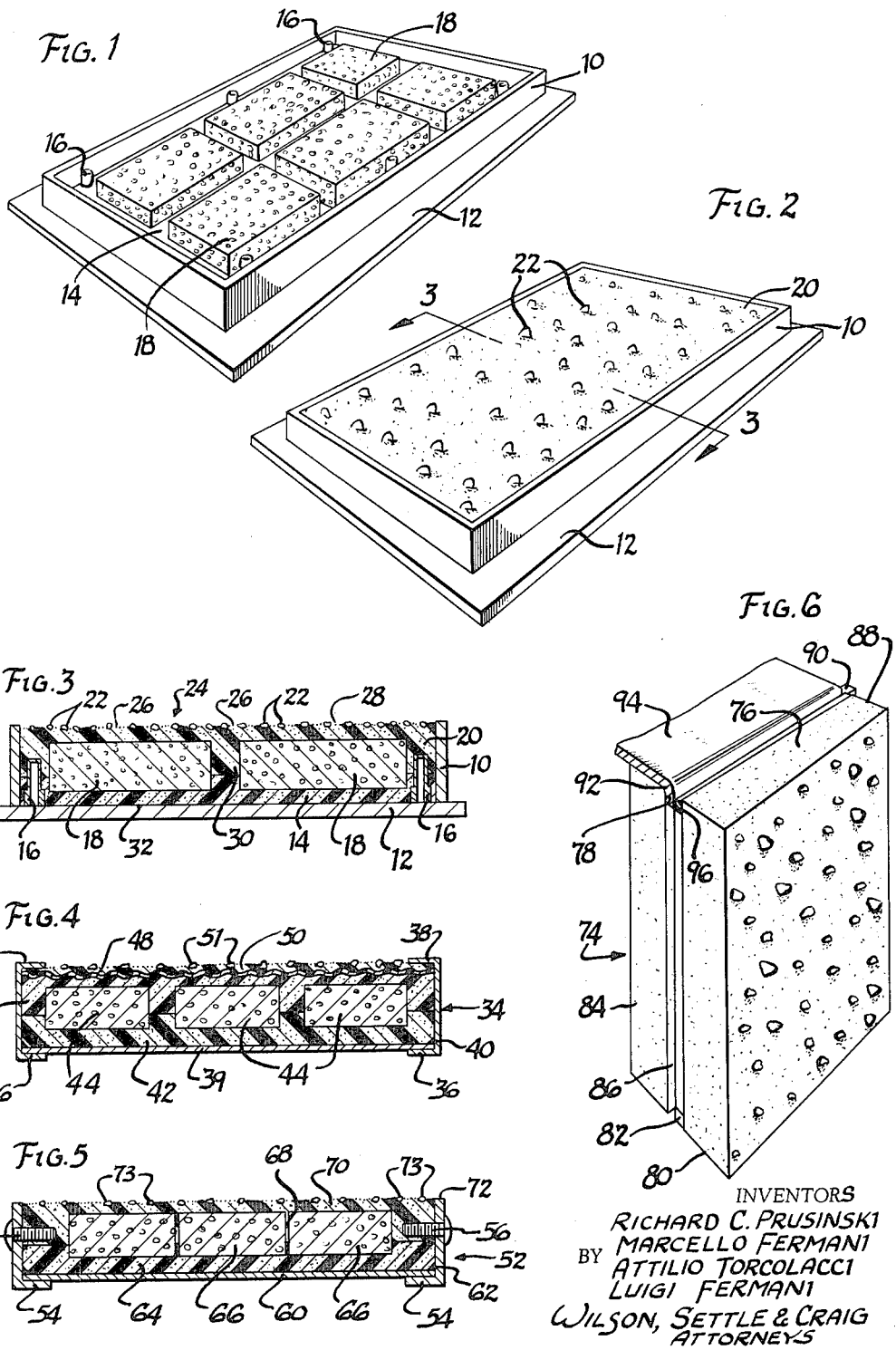
INVENTORS
RICHARD C. PRUSINSKI
MARCELLO FERMANI
BY ATTILIO TORCOLACCI
LUIGI FERMANI
WILSON, SETTLE & CRAIG
ATTORNEYS

United States Patent Office 3,232,017
Patented Feb. 1, 1966

3,232,017
INSULATED STRUCTURAL PANEL WITH SYNTHETIC FOAM CORE AND ORNAMENTAL FACING OF VISIBLE DISCRETE PARTICULATE MATERIAL
Richard C. Prusinski, Dearborn, and Marcello Fermani, Attilio Torcolacci, and Luigi Fermani, Detroit, Mich., assignors to Architectural Research Corporation, Detroit, Mich., a corporation of Delaware
Filed Feb. 7, 1963, Ser. No. 256,960
9 Claims. (Cl. 52—309)

This invention relates to a panel construction, and more particularly to an ornamental panel construction useful for example, in the construction of the walls of a building.

The panels of the present invention are similar in function to concrete ornamental panels which are fabricated by imbedding ornamental particles such as marble or granite chips in concrete. Concrete panels have been widely used in the past but have several inherent disadvantages. Firstly, it is necessary to construct such panels as relatively thick elements in order to provide sufficient strength for many applications. The thickness of concrete panels results in a high-weight panel which is difficult or impractical to use in many applications. Additionally, concrete does not form a good bond with ornamental chips. Further, concrete requires a long cure time anr the decorative chips are required to be acid cleaned to remove the concrete from the surface thereof after the formation of the concrete panel. Concrete also has poor heat insulation value. Each of these latter factors results in relatively high manufacturing cost.

The present invention overcomes these problems by providing an ornamental panel which combines desired characteristics of high-strength, low weight, extreme durability and weatherability, and high stain resistance.

An object of the invention is to provide an ornamental panel which is particularly useful in forming walls of a building but which is also useful for other applications such as the formation of table tops, interior and exterior flooring and the like.

Another object of the invention is to provide an ornamental panel which has very good heat-insulating qualities.

A still further object of the invention is to provide a panel in which low-cost blocks of rigid foamed material are utilized, resulting in appreciably reducing the cost of the finished panel structure.

Another object of the invention is to provide a panel construction in which high strength is obtained through a novel arrangement in which blocks of foamed material are encased between layers of plastic material in a manner to provide solid ribs of plastic material between the blocks for compressive strength and at the same time to provide foamed material within the plastic to reinforce the plastic.

A further object of the invention is to provide an ornamental panel which remains rigid and self-sustaining under heavy load conditions.

Another object is to provide decorative chips imbedded in the surface of the resinous panel material, the resinous material being filled with small mineral particles, such as sand, which impart to the resin a surface texture simulating concrete, the small mineral particles additionally acting to reinforce the resin.

A still further object of the invention is to provide an ornamental panel construction which can be manufactured with relatively simple, low-cost forming apparatus.

Another object of the invention is to provide an ornamental panel having high corrosion resistance, thermal insulating qualities, and bondability to other structures on which it may be mounted.

Other objects of this invention will appear in the following description and appended claims, reference being had to the accompanying drawings forming a part of this specification wherein like reference characters designate corresponding parts in the several views.

In the drawing:

FIGURE 1 is a view in perspective of a forming apparatus illustrating a partially completed ornamental panel in accordance with one embodiment of the present invention;

FIGURE 2 is a perspective view similar to FIGURE 1 illustrating a completely formed ornamental panel;

FIGURE 3 is a sectional view taken substantially along the line 3—3 of FIGURE 2 looking in the direction of the arrows;

FIGURE 4 is a sectional view similar to FIGURE 3 illustrating another embodiment of the invention in which the forming apparatus is utilized as a permanent frame for the ornamental panel;

FIGURE 5 is a sectional view similar to FIGURE 3 illustrating another embodiment in which forming apparatus acts as a frame for the completed panel; and FIGURE 6 is a view in perspective of a panel construction according to the invention in which tongue and groove constructions are provided on the top, bottom and side surfaces of the panel to interlock adjacent panels in a completed wall structure.

Before explaining the present invention in detail, it is to be understood that the invention is not limited in its application to the details of construction and arrangement of parts illustrated in the accompanying drawing, since the invention is capable of other embodiments and of being practiced or carried out in various ways. Also, it is to be understood that the phraseology or terminology employed herein is for the purpose of description and not of limitation.

Referring to FIGURE 1, it will be seen that the panel is formed in a rectangular frame 10 which rests on the flat surface of supporting structure 12.

The first step in the formation of the panel is to pour a liquid resin material into the frame 10 to partially fill the frame and form a first resinous layer 14. In the embodiment shown, a plurality of internally threaded female inserts 16 are provided to receive bolts for the mounting of the finished panel. The inserts 16 are set on the support structure 12 in spaced apart relation adjacent the frame 10 before the resin is poured. As an alternate to the use of inserts 16, flat metal plates with upwardly projecting structure may be set on the support structure 12 and subsequently partially encased in the resin with the projecting structure firmly anchoring the plates to the panel. The exterior surfaces of the flat metal plates are subsequently used to weld the finished panel to a metallic support surface.

The resinous material may be any of a variety of suitable curable resins. A suitable resin may be either an epoxy resin or a polyester resin. Chemically, epoxy resins consist generally of the reaction product of epichlorohydrin and Bisphenol "A" made under alkaline conditions. Other dihydric phenols may be used to react with the epichlorohydrin to produce suitable epoxy resins. The epoxy resins can be characterized chemically as glycidylethers of dihydric phenols. Polyester resins consist of the reaction product of a dibasic acid and dihydric alcohol dissolved in a polymerizable monomer. The dibasic acids used in the resin solution may be phthalic anhydride, iso-phthalic acids, adipic acid, tetra phthalic anhydride, maleic acid, fumaric acid, or itaconic acid. The dihydric alcohols in the polyester resin solution may, for example, be any glycol such as ethylene glycol, propylene glycol, diethylene glycol, dipropylene glycol, or 1–3 butylene glycol. The polymerizable monomer used in the polyester resin solution can, for example, be styrene, vinyl toluene, methyl methacrylate, or diallyl phthalate.

The present invention is not concerned with the particular resins per se, and it will be understood that resinous materials other than those specified above can be employed in practice of the invention.

Various filler materials can be intermixed in the resin, as for example, small mineral particles, asbestos fibers, ground chalk, finely ground wood chips, and fiberglass wool. The filler may be combined with suitable pigments to provide a desired color in the finished panel.

The preferred filler material is small mineral particles. The particles may be, for example, sand, marble, granite or the like. Silica sand is preferred. The mineral particles serve two functions in addition to acting as an inexpensive fill. Firstly, they perform the usual function of reinforcing the resin to increase the overall strength of the panel. Secondly, and more importantly, the particles give the exterior surface of the panel a texture similar to that of concrete. The usual glossy appearance of a resin is considered objectionable in many applications, the texture of concrete being preferred. The desired texture is achieved as the result of the particles which are at or near the outer surface of the panel.

After the first layer 14 has been poured, blocks of rigid foamed material 18 are impressed into the layer 14 in spaced apart relationship. The blocks 18 are put in place while the resin is still in the liquid state. They are pressed into the resin a short distance to insure a good bond between the blocks and the resin. Because of the porous nature of foamed material, the resin seeps into the blocks and impregnates the blocks for a short distance. This impregnation insures a good mechanical bond in addition to an adhesive bond.

Then, as illustrated in FIGURE 2, a second layer 20 of the resin having a mineral particle filler is poured over the first layer 14 to cover the blocks 18 and inserts 16. The panel is completed by imbedding small, irregularly shaped stones or ceramic pieces 22 in the exterior surface of the layer 20. The pieces 22 may be such as glass, quartz, marble or granite. The imbedding is accomplished in any desired manner while the resin is still in a plastic state. As will be noted, a portion of the stones 22 project beyond the exterior surface of the layer 20. This gives the panel a desired roughened appearance which is suitable for many applications, for example, when the panel is used as wall panelling or as a structural wall. After the stones 22 have been imbedded, the resin is allowed to cure to a solid state at which time the frame 10 is removed and the panel is completed and ready for use.

The structure of the finished panel 24 may best be seen in FIGURE 3. As will be noted, the stones 22 and some of the small mineral particles 26 are visible on the exterior surface 28. The layers of resin 14, 20 completely encase the blocks 18. Ribs 30 of the resin material are formed adjacent and between the blocks 18 to give the panel high compressive and tensile strength. The inserts 16 are in a position to permit bolting of the interior surface 32 of the panel 24 to a supporting structure.

Various types of rigid foamed materials may be utilized to fabricate the blocks 18. However, foamed polyurethane or foamed glass are preferred materials. Foamed polyurethane is preferred for some applications in which high heat-insulation properties are desired. On the other hand, foamed glass, which is a relatively strong material, is preferred when high panel strength is a desired characteristic. Generally, the blocks 18 may be from three-quarters of an inch to three inches thick. The thickness of the blocks depends on the desired ultimate panel thickness.

The use of the foamed material blocks results in several advantageous characteristics of the panel. Firstly, foamed material in comparison to resin materials is relatively inexpensive. The blocks thus act as a space filler to reduce the overall cost of the panel. Additionally, the foamed blocks are lighter than an equal volume of resin and reduce the overall weight of the panel. This is important in many applications where weight is a factor. Finally, the use of the foamed blocks results in a panel having an overall increase in strength over a comparable solid resin panel. The increase in strength is particularly noticeable in bending or in connection with other forces which would tend to crack the panel.

If it is desired to have a smooth exterior surface on the panel, the reverse process of fabrication may be used. That is, flat stones, such as marble chips may first be laid on the supporting surface 12 and covered with a layer of resin. The blocks may then be set into this layer of resin and then a second layer of resin poured to form the finished panel. In this alternate method, the exterior surface of the stones is flush with the exterior surface of the first layer of resin, resulting in a smooth surface suitable for table tops or flooring.

FIGURE 4 illustrates another embodiment of the panel construction. As thereshown, a permanent metallic frame 34 is utilized rather than a frame such as the frame 10 which is removed after the panel is formed. The frame 34 may be fabricated from a material such as aluminum or steel. The frame is constructed in rectangular form with side and end walls having a continuous inturned flange 36, 38 at the lower end and upper ends thereof. A backup panel 39, constructed of a material such as asbestos, aluminum or steel, is first laid in the frame 34 and rests on the lower flange 36. A caulking material 40 is applied at the juncture of the outer edges of the panel 39 and the frame 34. This results in the panel 39-frame 34 construction being fluid tight.

Then, as in the FIGURE 1 embodiment, a first layer 42 of resin filled with mineral particles is poured into the frame 34. Blocks 44 of foamed material are then set into the layer 42 in spaced apart relationship as previously described. A second layer 46 of the filled resin is then poured over the blocks 44 to completely encase the blocks.

The second layer 46 may completely fill the frame to result in the finished panel. However, in the embodiment shown, the second layer 46 does not completely fill the frame 34. A sheet 48 of wire screen, woven fiberglass or other foraminous material is applied onto the uper face of the layer 46 so as to completely overlie the plastic mass. The function of the sheet 48 is to interlock the various plastic areas together so that a panel of rigid, non-flexible self sustaining character may be formed. The use of a sheet of foraminous material is desirable when it is desired to increase the strength of the panel. It should be noted that the bonding properties of fiberglass are particularly good, especially when used with the specified plastics. Fiberglass cloth is very flexible but when impregnated with plastic forms a very rigid, non-flexible mass of high structural strength. A thin layer 50 of the filled resin material is poured over the sheet 48 to the level of the upper flange 38. The construction is then completed by imbedding stones 51 into the layer 50.

An embodiment of the panel similar to the FIGURE 4 panel is illustrated in FIGURE 5. In this embodiment, a rectangular frame 52 is provided which has a flange 54 at only the lower end of the frame walls. In order to lock the panel construction into the frame 54, a plurality of bolts 56 are threaded into openings in the side walls of the frame to extend into the frame interior. This acts as a double safety precaution to prevent the interior panel construction from falling out of the frame.

The FIGURE 5 embodiment illustrates another variation in the panel construction. As will be noted, a backup panel 60 is first laid into the frame and rests on the flange structure 54. Caulking 62 is applied as in the FIGURE 4 embodiment. Then the first layer 64 of resin is poured into the frame. The blocks 66 of foamed material are then set into the layer 64. However, the blocks 66 are placed much closer together than in the previous embodiment. A thin layer 68 of resin will form between the blocks. However, the blocks fill substantially the entire interior of the panel and thus considerably reduce the amount of resin which must be used. This results in a lower cost panel construction. Such a construction may be utilized where the necessary strength characteristics of the completed panel are relatively low. The FIGURE 5 construction is completed by pouring a second layer 70 of the resin material into the frame 52 to the level of the upper edges 72 and imbedding the stones 73 therein.

A further embodiment of the invention is illustrated in FIGURE 6. The FIGURE 6 panel 74 is formed by the method illustrated in FIGURE 1. However, a tongue and groove structure is provided in the upper, lower and side surfaces to aid in installation of the panel. The upper surface 76 is provided with a groove 78. The lower surface 80 is provided with a tongue 82. One side surface 84 is provided with a groove 86 and the other side surface 88 is provided with a tongue 90. Each of the tongues and grooves mentioned extend for the entire length of their respective surfaces.

The groove 78 in the upper surface 76 may conveniently be used to receive the edge 92 of roofing member 94. The groove is then filled with caulking 96 to make the joint fluid-tight. When the groove 78 is used for such roof flashing, it is termed a "reglet." The groove 78 may also be utilized to receive the tongue 82 of a superjacent panel when the height of a wall requires two or more panels. Similarly, the groove 86 in the side surface of the panel acts to receive the tongue 90 of an adjacent panel when two or more panels are placed side by side. As is usual in such constructions, a sealing and binding cement may be applied along the side edges of the panel to hold the panels in place and to seal the panel joints against the ingress of weather.

Having thus described our invention, we claim:

1. An ornamental panel comprising first and second layers of resinous material adhered together, a plurality of relatively rigid blocks of foamed material encased between said first and second layers, at least one of said first and second layers having mineral particles intermixed therein, and a plurality of mineral chips substantially larger than said mineral particles imbedded in the exterior surface of the layer having mineral particles therein.

2. An ornamental panel as in claim 1 and further characterized in the provision of a longitudinally extending groove in the top surface and in one of the side surfaces and a longitudinally extending tongue on the bottom surface and the other of the side surfaces.

3. An ornamental panel comprising first and second layers of resinous material adhered together, a plurality of relatively rigid blocks of foamed material encased by said first and second layers, said blocks being spaced apart and said resinous material filling the space between the blocks to form a rib structure, at least one of said first and second layers having mineral particles intermixed therein, and a plurality of mineral chips substantially larger than said mineral particles imbedded in the exterior surface of the layer having mineral particles therein.

4. An ornamental panel comprising a first layer of resinous material, a plurality of relatively rigid spaced apart blocks of foamed material partially imbedded in said first layer, a second layer of resinous material adhered to said first layer and completely encasing the remaining portions of said blocks, the resinous material of the first and second layers filling the spaces between the blocks to form a rib structure, at least one of said first and second layers having mineral particles intermixed therein, and a plurality of mineral chips substantially larger than said mineral particles imbedded in the exterior surface of the layer having mineral particles therein.

5. The panel of claim 4 and further characterized in that said mineral particles are sand.

6. An ornamental panel comprising first and second layers of resinous material adhered together, a plurality of relatively rigid blocks of foamed material encased by said first and second layers, a foraminous reinforcement sheet overlying said second layer, a third layer of resinous material impregnating the foraminous sheet and bonded to said second layer, said third layer of resinous material having mineral particles intermixed therein, and a plurality of mineral chips substantially larger than the mineral particles imbedded in the exterior surface of the third layer.

7. An ornamental panel comprising a generally rectangular frame having a side wall construction with flange elements extending towards the center of the frame from both the upper and lower ends of the side walls, a panel within the frame extending between the side walls and seated on one of the flange elements, a first layer of resinous material on the panel and within the frame, a plurality of relatively rigid blocks of foamed material partially imbedded in said first layer, a second layer of resinous material adhered to said first layer and completely encasing the remaining portions of said blocks, said second layer of resinous material extending to substantially the level of the other flange element, said second layer of resinous material having mineral particles intermixed therein, and a plurality of mineral chips substantially larger than said mineral particles imbedded in the exterior surface of said second layer.

8. An ornamental panel comprising a generally rectangular frame, said frame having a side wall construction with a flange element extending from one end thereof towards the center of the frame, a plurality of projections in said side wall constructions spaced from the flange element and extending towards the center of the frame, a panel within the frame and seated on said flange element, a first layer of resinous material within the frame on the panel, a plurality of relatively rigid blocks of foamed material partially imbedded in said first layer, a second layer of resinous material adhered to said first layer and completely encasing the remaining portions of said blocks, said second layer of resinous material substantially filling the frame, said second layer of resinous material having mineral particles intermixed therein, and a plurality of mineral chips substantially larger than said mineral particles imbedded in the exterior surface of the second layer.

9. A rigid panel construction comprising a plurality of spaced apart relatively rigid blocks of foamed material, resinous material encasing said blocks and filling the space between the blocks to form a strengthening rib structure, at least a portion of said resinous material having mineral particles intermixed therein, and a plurality of mineral chips substantially larger than said mineral particles imbedded in an exterior surface of the resinous material having mineral particles therein.

References Cited by the Examiner

UNITED STATES PATENTS

| | | | |
|---|---|---|---|
| 1,477,520 | 12/1923 | Pittman | 52—576 |
| 1,777,872 | 10/1930 | Brown | 52—342 |
| 1,953,410 | 4/1934 | Jacobson | 52—144 X |
| 2,151,148 | 3/1939 | Plumb | 52—405 |
| 2,351,856 | 6/1944 | Henderson | 52—206 |
| 2,858,580 | 11/1958 | Thompson et al. | 52—309 X |
| 2,869,336 | 1/1959 | Smidl et al. | 52—404 X |
| 3,000,144 | 9/1961 | Kitson | 52—309 |
| 3,030,687 | 4/1962 | Muspratt | 52—303 X |

FRANK L. ABBOTT, *Primary Examiner.*

HENRY C. SUTHERLAND, *Examiner.*

J. L. RIDGILL, *Assistant Examiner.*